April 9, 1935.  F. G. LOGAN  1,997,179
ELECTRIC CONTROLLING APPARATUS
Filed May 7, 1931   3 Sheets-Sheet 1
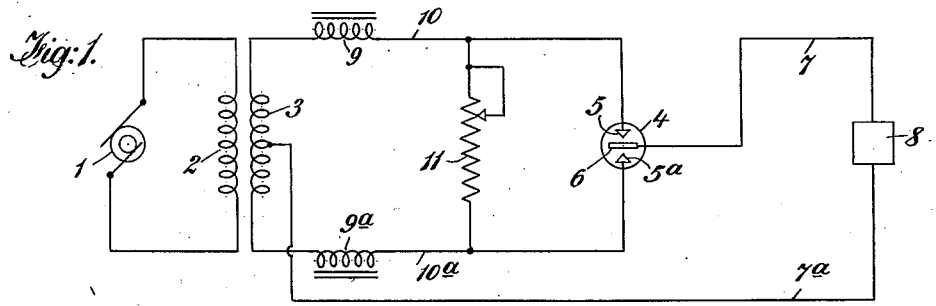
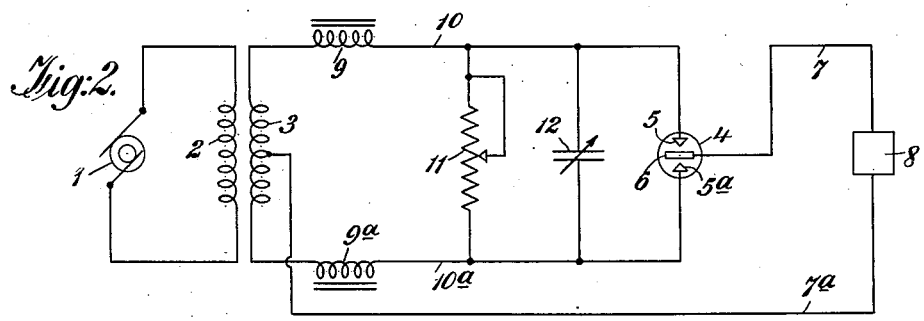
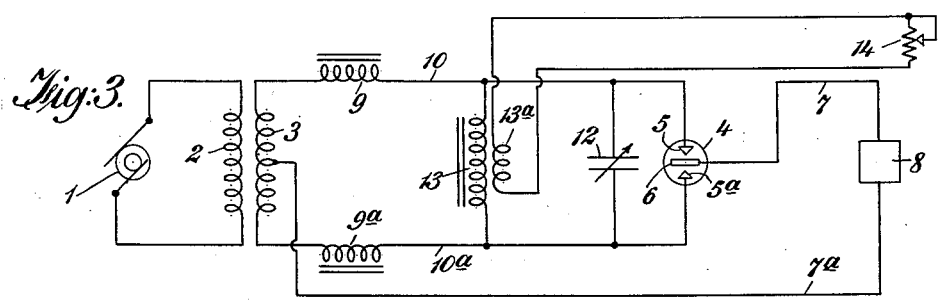
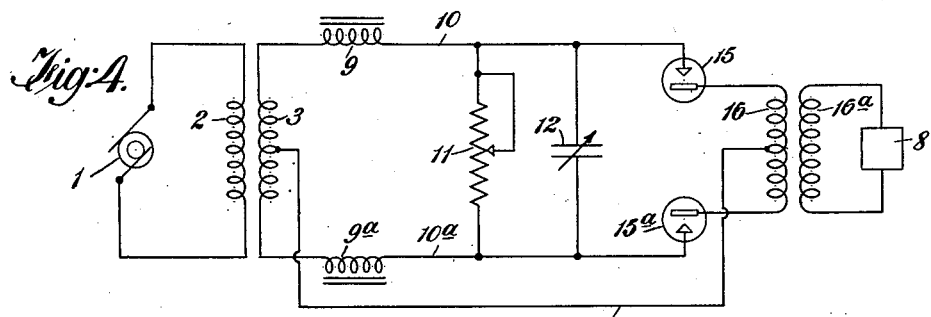
INVENTOR
Frank G. Logan
BY Lawrence K. Sager
his ATTORNEY

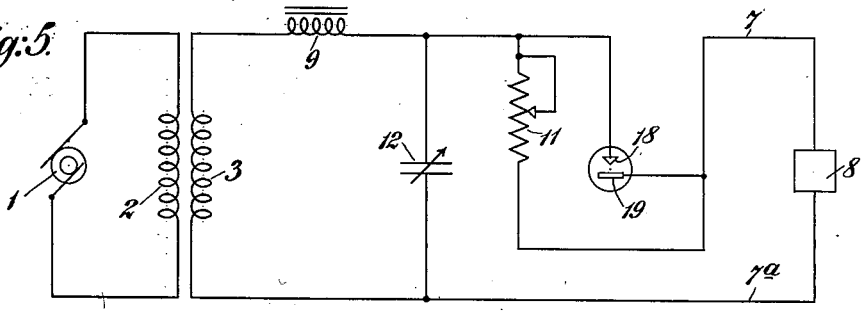
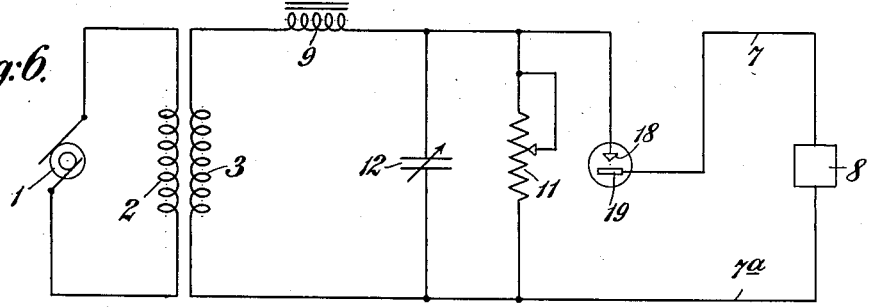
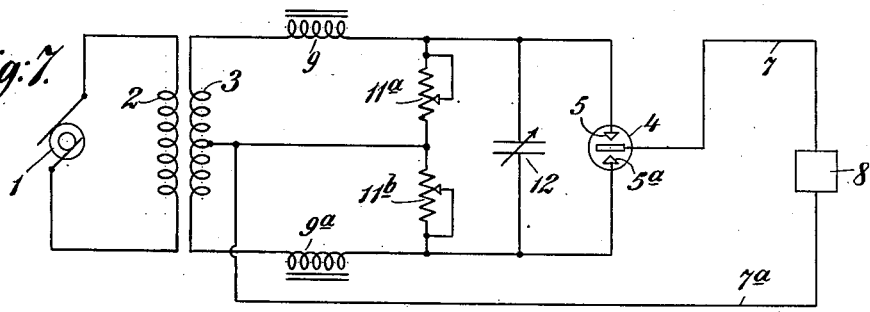
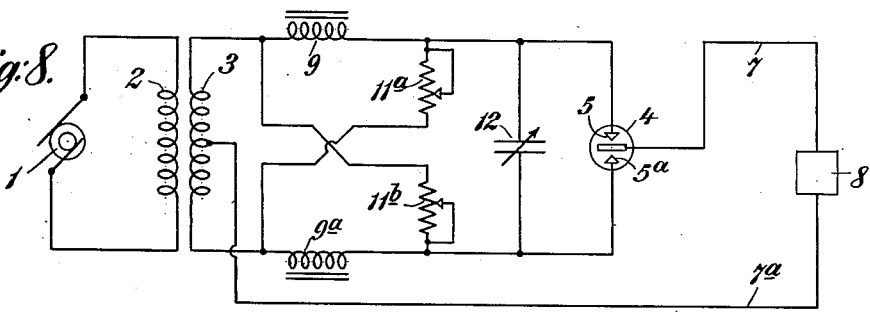

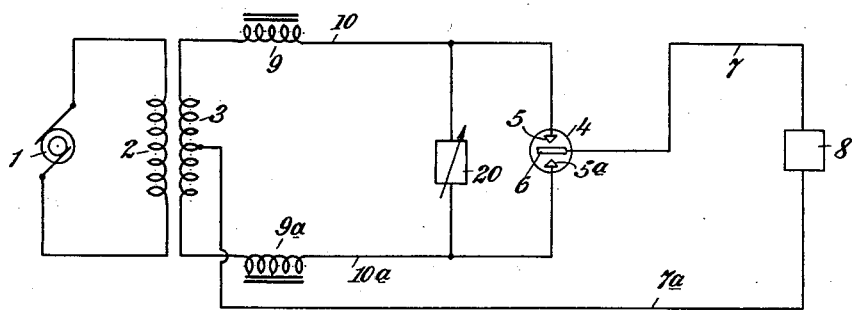
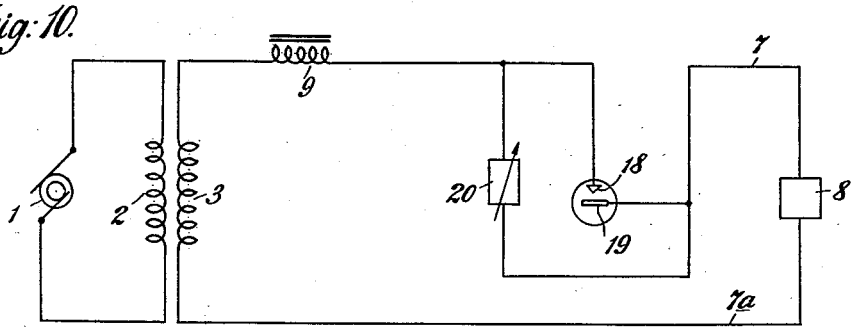
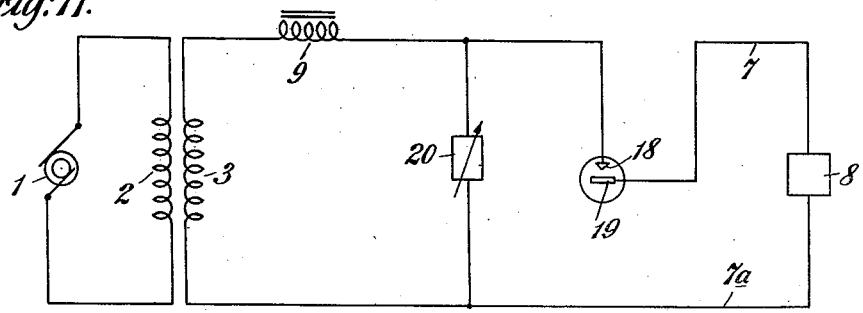

Patented Apr. 9, 1935

1,997,179

UNITED STATES PATENT OFFICE 1,997,179

ELECTRIC CONTROLLING APPARATUS

Frank G. Logan, Mount Vernon, N. Y., assignor to Ward Leonard Electric Company, a corporation of New York Application May 7, 1931, Serial No. 535,600

21 Claims. (Cl. 175—363)

This invention particularly relates to the control of the current or voltage of a consumption circuit as may be desired for any purpose where the energy is derived from an alternating current source. Although the invention is applicable to the control of current or voltage generally for any purpose, it is particularly applicable where it is desired that the load be supplied with direct current. It may be used for the control of incandescent lamps from maximum brilliancy to minimum or no brilliancy, for charging storage batteries and control of the rate of charge and adaptation to any number of cells, for the supply of arc lamps and adjustment of the voltage supplied to the arc electrodes as desired in projection work and the like, for controlling the voltage and current supplied to the field circuit of generators and motors, for the control of the current in the direct current circuit of alternating current reactors, and in general for any purpose where it is desired to control the voltage applied to the load, or the current in the consumption circuit.

In carrying the invention into effect, a rectifier is introduced between the alternating current supply and the load circuit; and the control of the current and voltage applied to the load is based upon the control of the recurring transient conditions in the circuits supplying current to the rectifier. By adjustment and control of these recurring transient conditions, the energy delivered to the consumption circuit may be controlled even over wide limits.

In practising the invention, it has been found that the energy used in the control circuit is very small in comparison with the energy controlled, which makes the apparatus highly efficient and also permits the controlling circuit, or circuits, to be conveniently located at any desired control point.

The main object of the invention is to provide an improved method and improved form of controlling apparatus which will have the advantages of simplicity and low initial cost and high efficiency in operation. Another object is to provide apparatus which will be reliable and durable. Another object is to provide apparatus wherein the adjustable device or devices for securing the controlling effects may be of small size and conveniently located at any desired point remote from the main apparatus. Another object is to provide apparatus which may be of comparatively small size and generate comparatively little heat, so that the same may be adapted for installation in a limited amount of space.

Other objects and advantages will be understood from the following description and accompanying drawings which indicate preferred embodiments of the invention.

Fig. 1 is a diagram illustrating one form of the invention as applied to the use of single phase alternating current energy; Fig. 2 is a similar diagram with an additional controlling device; Fig. 3 is a similar diagram showing a modified form of control; Fig. 4 is a diagram showing an application of the invention to the control of energy in the consumption circuit where the latter is an alternating current circuit; Fig. 5 is a diagram showing an embodiment of the invention where a half wave rectifier is utilized; Fig. 6 is similar to Fig. 5, except the connection of the controlling resistance; Figs. 7 and 8 are diagrams similar to Fig. 2, except the connection of the controlling resistance circuits; and Figs. 9, 10 and 11 are diagrams similar to Figs. 1, 5 and 6 except that a general indication is used for the controlling means.

Referring to Fig. 1 the single phase source 1 of alternating current energy is indicated supplying the primary 2 of a transformer, having a secondary winding 3. A full wave rectifier is indicated at 4 having its anodes 5 and 5a connected respectively to the terminals of the secondary winding 3. The common cathode 6 of the rectifier is connected to one line 7 of the consumption circuit and supplies current to any form of translating device or devices indicated generally at 8, the return line 7a of the consumption circuit being connected to the midpoint of the secondary 3 of the transformer, in the usual manner. An impedance device, or reactor 9, is inserted in the line 10 which connects one terminal of the secondary with the anode 5; and a similar reactor 9a is connected in the line 10a connecting the other terminal of the secondary to the anode 5a. An adjustable resistance 11 is connected across the circuit supplying the anodes and to points located between the reactors and the anodes.

It has become common practice to insert reactors in the lines connected to the anodes mainly for the purpose of reducing the extent of the pulsation in the direct current consumption circuit by causing the waves derived from the rectifier to overlap each other.

In a rectifying circuit containing no inductance, the rectified current is in phase with the supply potential with conduction starting in each cycle when the supply potential exceeds the characteristic inherent voltage drop of the rectifier. If reactance is introduced into the circuit, conduction starts at approximately the same supply potential as before reactance was introduced. However, due to the fact that the current, or energy, is initiated at a time phase unsuitable to the energy conditions of the circuit, modification of the current occurs until energy is stored in the reactance. This storage cannot be accomplished instantly and as the rectifier conducts, the current rises gradually from zero until the time phase appropriate to the particular combination of reactance and resistance is approximated as nearly as may be before the current ceases to flow, that is before the rectification ceases. It is apparent that if the energy conditions of the reactance can be adjusted to be more or less appropriate to the normal conditions required by the amount of supply voltage at the moment conduction starts, the resultant energy and current delivered to the direct current consumption circuit will be decreased or increased at will. The adjustment of the reactance energy state may be accomplished by change of the amount of that energy or by adjustment of the time relative to the supply voltage at which the rectifier starts conduction. The conventional representation of the adjustment of a newly initiated circuit containing reactance to the appropriate time phase with the supply voltage, is that of steady state conditions plus a transient term lasting normally a few cycles. Therefore, it may be considered that control of transient conditions of energy or current in a rectifier circuit will control the amount of energy or current in the direct current consumption circuit. The so-called transient conditions exist while the rectifier is actively conducting current and recur each cycle. The phenomena of transients in a rectifier circuit are those of recurring transients.

The present invention provides a method and means for controlling the transient conditions as may be desired for the purpose of controlling the energy and current in the consumption circuit from any desired maximum to any desired minimum. This is accomplished by causing the reactor which is inactive in carrying the current of the consumption circuit to be supplied, by auxiliary means, with current, controlled and regulated as desired, to affect the energy and current which the reactor can pass to the consumption circuit when it again becomes active. In the particular example of Fig. 1, this means is the adjustable resistance 11.

If a period of time be assumed when the reactor 9 and anode 5 are active in carrying current going to the consumption circuit and the reactor 9a and anode 5a are inactive, it is apparent that under these conditions, the rheostat 11 provides a path for current to flow from one terminal of the secondary 3 through the reactor 9, wire 10, rheostat 11, wire 10a and reactor 9a to the other terminal of the secondary. The result is that by means of the shunt circuit formed by the rheostat 11, a current is caused to flow through the otherwise inactive reactor 9a in a direction opposite to that in which the current will flow when the reactor 9a becomes active in carrying current for the consumption circuit. The conditions thus set up in the reactor 9a, as regards its flux and energy conditions tends to establish in greater or lesser degree, as determined by the adjustment of the rheostat 11, the conditions which would exist if the reactor 9a had not been subjected to an inactive condition as regards supply of energy to the consumption circuit. Consequently, when the reactor 9a again becomes normally active, the amount of energy and current which the reactor 9a is permitted to deliver to the consumption circuit is correspondingly controlled as may be desired. It is evident that when the reactor 9a is active in the supply of the consumption circuit, the shunt circuit formed by the rheostat 11 then provides a path for supplying the controlling energy or current to the reactor 9 so as to correspondingly affect the energy or current permitted to pass in the reactor 9 when it again becomes active in supplying the direct current consumption circuit. It has been found in practise that the controlling current of the rheostat 11 with reference to the energy controlled is very slight for obtaining desired variations of current in the consumption circuit. Thus the rheostat 11 may be of comparatively small capacity and may be conveniently located at a point remote from the apparatus controlled.

Fig. 2 is similar to Fig. 1 and the parts are similarly numbered; but in Fig. 2 there is added a capacitive device or condenser 12 indicated as adjustable, and connected across the lines 10 and 10a in parallel with the resistance 11. The condenser 12 will obviously serve to change, as may be desired, the phase relation of electromotive force, and current passing through the otherwise inactive reactor, so as to additionally affect the energy and current which will pass through this reactor when it becomes active in delivering current to the consumption circuit. The condenser may be said to have the opposite effect to that of the rheostat 11 on the controlling energy of the reactors and, with maximum resistance of the rheostat 11 inserted, may cause the transient energy and current to be increased over what it would be without the auxiliary controlling apparatus. Thus by the combined use of the rheostat and adjustable condenser, the range of control of the energy and current in the consumption circuit may be largely increased. In some instances the capacitive device may be used alone.

Fig. 3 is similar to Fig. 2 and the parts correspondingly numbered, except that instead of placing the controlling resistance directly across the lines 10 and 10a, the primary 13 of a transformer is connected across these lines, the secondary 13a thereof being connected to an adjustable resistance or rheostat 14. This embodiment of my invention has the advantage that the voltage applied to the rheostat connected to the secondary of this transformer may be made as desired compared to that of the rheostat 11 in Figs. 1 and 2, thus procuring further advantage in the convenience of remote location of the controlling rheostat when supplied by the secondary of a transformer. By varying the amount of resistance in the circuit of the secondary 13a, the current permitted to pass through the primary 13 and through the inactive reactor may be controlled as desired with similar effects to that already described with reference to Fig. 1.

The size and cost of the reactors in practising this invention may be comparatively small for the purpose of securing the controlling effect, because they may be operated under a saturated condition when active in carrying current to the consumption circuit and still be highly sensitive to charge of controlling current. Similarly, the controlling impedance device of the desired character may be comparatively small for securing a wide range in controlling effect and, as explained with reference to the rheostats 11 and 14, may be conveniently located at any desired remote control location.

Fig. 4 shows an embodiment of the invention applied to the control of an alternating current consumption circuit. Here, instead of using a full wave rectifier, two single or half wave rectifiers 15, 15a are used. Their anodes are connected respectively to the reactors 9 and 9a; and their cathodes are connected to the terminals of the primary 16 of a transformer, the secondary 16a of which supplies the translating device, or devices, of the consumption circuit. A connection 17 extends from the mid-point of the primary 16 to the mid-point of the secondary 3. When current passes through the half wave rectifier 15, through one half of the primary 16 and back to the mid-point of the secondary 3, the change in flux of the transformer by the passage of current through a portion of the primary 16, causes an electro-motive force to be induced in the secondary 16a and passage of current in one direction in the consumption circuit. When current is supplied by the rectifier 15a through half of the primary 16 and back to the mid-point of the secondary 3 during the next half wave, an electro-motive force is induced in the secondary 16a in the opposite direction and causes a current to flow in the consumption circuit in the opposite direction to that when the rectifier 15 supplied current to the primary 16. Thus alternating current is developed in the consumption circuit. The operation of the apparatus shown in Fig. 4, as regards control of transient conditions, is the same as that already described with reference to the foregoing figures, the parts being correspondingly numbered in Fig. 4.

The invention is also applicable to instances of half wave rectification. Fig. 5 illustrates an embodiment of the invention in simple form as applied to the supply of intermittent half waves to a direct current consumption circuit. The anode 18 of the half wave rectifier is connected through the reactor 9 to one terminal of the source, or to one terminal of the secondary where a supply transformer is interposed. The cathode 19 is connected by wire 7 to the translating device, or devices, 8 and the circuit is completed by wire 7a to the other terminal of the source, or other terminal of the secondary where a supply transformer is used. The controlling resistance 11 is connected across the terminals of the rectifier; and the controlling condenser 12, when used, is connected from a point between the reactor 9 and anode 18 to the other side of the consumption circuit. In this utilization of the invention, current will pass through the reactor 9, anode 18, cathode 19 and through the translating devices back to the source during the half wave periods when the anode 18 is positive. During the half wave periods when the electro-motive force of the alternating current source is in the reverse direction, the controlling current passes through the reactor 9, rheostat 11 and load 8 in the opposite direction to that which occurs when the consumption circuit is being actively supplied with utilized energy. Thus, during the negative, or non-active periods, current is caused to flow in the reactor 9 in the opposite direction to that which passes therethrough when the same is effective in supplying the consumption circuit, thus securing an effect similar to that already described with reference to the foregoing figures. By adjustment of the rheostat 11, the value of the controlling current and the phase relationship of the electro-motive force and current is caused to be such that the transient conditions are controlled as desired to give desired control of voltage and current in the consumption circuit. Also, when desired, the controlling capacitive device 12 may be used to augment the controlling effect by further adjustment of the relationship of electro-motive force and current of the controlling energy.

When the load 8 is an inductive load, or one in which a counter electro-motive force is developed, it is desirable to cause the current through the controlling resistance 11 of Fig. 5 to also pass through the load. This is for the purpose of causing the phase relation of electro-motive force and current of the controlling energy to correspond with that of the load energy, so that the controlling energy will be correspondingly effective in its effect upon the transient energy. When the load has no counter electro-motive force effect, the rheostat 11 may be connected, as shown in Fig. 6, from a point between the reactor 9 and the anode 18 to the opposite line 7a of the transformer secondary 3, or opposite line of the supply circuit, without passing through the load.

It is evident from the consideration of the apparatus of Figs. 5 and 6 that the controlling resistance 11 when utilized in full wave rectifying apparatus, may be sub-divided into two controlling resistances and thereby attain a controlling effect which is substantially a duplication of the action occurring when a half wave rectifier is used. Thus, in Fig. 7, the parts correspond to those of Fig. 2, except that the controlling resistance 11 is sub-divided into two controlling resistances 11a and 11b, with their junction point connected to the mid-tap of the secondary 3. In practice, the single controlling resistance 11 would be preferable to the use of two resistances 11a and 11b, not only on account of the advantage of using one controlling resistance instead of two, but also because the latter requires the running of three leads to the rheostats at the remote control location, as required by Fig. 7, instead of two leads in Figs. 1 to 4.

Fig. 8 shows another embodiment of this invention wherein the controlling resistance for full wave rectification is sub-divided into two parts 11a and 11b, as in Fig. 7, but in Fig. 8 each resistance is connected from a point between a reactor and anode across the line to a point between the other reactor and one terminal of the secondary 3. In this case the control circuits are not subjected to the voltage drop of the reactors at the time they are active. This form of the invention is not ordinarily as desirable as the others, mainly on account of requiring two rheostats instead of one, and also because of requiring four leads to the remote controlling resistances instead of two leads as in Figs. 1 to 4.

Evidently the adjustable controlling device may be a resistance device either non-inductive or inductive, or may be a capacitative device or any combination thereof and any such device is covered by the term impedance device. Thus in Figs. 9, 10 and 11, the controlling device of whatever character it may be is indicated generally as the adjustable impedance device 20. Fig. 9 is the same as Fig. 1 except as to this general indication in place of the adjustable resistance 11; likewise Fig. 10 is similar to Fig. 5 with the general indication of impedance device 20 in place of the resistance 11; and Fig. 11 is the same as Fig. 6 except the general indication of the adjustable impedance device 20 replaces the resistance 11 and condenser 12.

It will be understood that where reference is made herein to a direct current consumption circuit, it is intended to cover a circuit carrying any form of unidirectional current, as regards the main energy, such as an intermittent current in one direction, or a more or less pulsating current, as determined by the character of apparatus used. Evidently, any desirable form of filter may be used in the direct current consumption circuit for reducing the extent of the pulsations. Where rectifying the alternating current is herein referred to, it will be understood to apply to the substantial suppression of the half wave in one direction, such as in the obtaining of an intermittent uni-directional current, as well as to full wave rectification.

The invention is applicable to any type or form of rectifier.

Although the invention is shown and described as applied to a single phase source of supply, it is, of course, applicable to polyphase alternating current supply circuits in the usual manner of adaptation for polyphase use.

Although I have described particular embodiments of the invention, it will be understood that various modifications and applications thereof may be made without departing from the scope of the invention.

I claim:

1. The combination of an alternating current supply circuit, a consumption circuit, rectifying means between said circuits, adjustable means connected directly between terminals of said rectifying means for causing a controlling current derived from said supply circuit to pass in a portion of the circuit of the rectifying means when the same is inactive in transmitting energy to the consumption circuit and in a direction opposite to that in which the current passes when the same is active in transmitting energy to the consumption circuit, and means in said portion of the circuit affected by the controlling current to control the energy transmitted to the consumption circuit.

2. The combination of an alternating current supply circuit, a consumption circuit, a rectifier comprising an anode between said circuits, a reactor in the anode circuit, and adjustable controlling means connected to the anode circuit for causing controlling current derived from said supply circuit to pass through said reactor when it is inactive in supplying the consumption circuit.

3. The combination of an alternating current supply circuit, a consumption circuit, a rectifier comprising an anode between said circuits, a reactor in the anode circuit, and controlling means connected to the anode circuit for causing controlling current derived from said supply circuit to pass through said reactor when it is inactive in supplying the consumption circuit, and means for adjusting the phase relation of the electromotive force and current of such control energy.

4. The combination of an alternating current supply circuit, a consumption circuit, a rectifier having anodes between said circuits, a reactor in each of the anode circuits, and adjustable controlling means connected to the anode circuits for causing controlling current derived from said supply circuit to pass through each reactor when it is inactive in supplying the consumption circuit.

5. The combination of an alternating current supply circuit, a consumption circuit, a rectifier having anodes between said circuits, a reactor in each of the anode circuits, and controlling means connected to the anode circuits for causing controlling current derived from said supply circuit to pass through each reactor when it is inactive in supplying the consumption circuit, and means for adjusting the phase relation of the electromotive force and current of such control energy.

6. The combination of an alternating current supply circuit, a consumption circuit, a rectifier having anodes between said circuits, a reactor in each of the anode circuits, and adjustable controlling means connected to the anode circuits for causing controlling current derived from said supply circuit to pass through each reactor when it is inactive in supplying the consumption circuit and in a different phase from that of the current through the reactor when the same becomes active in supplying the consumption circuit.

7. The combination of an alternating current supply circuit, a consumption circuit, a rectifier between said circuits having intermittently acting terminals, an impedance device in each of the circuits leading to said terminals respectively, and adjustable controlling means connected across the supply circuit and to points located between said terminals and their respective impedance devices.

8. The combination of an alternating current supply circuit, a consumption circuit, a rectifier between said circuits having intermittently acting terminals, an impedance device in each of the circuits leading to said terminals respectively, and adjustable impedance controlling means connected across the supply circuit to points located between said terminals and their respective impedance devices.

9. The combination of an alternating current supply circuit, a consumption circuit, a rectifier between said circuits having intermittently acting terminals, an impedance device in each of the circuits leading to said terminals respectively, and an adjustable controlling capacitive device connected between points located between said terminals and their respective impedance devices.

10. The combination of an alternating current supply circuit, a direct current consumption circuit, a rectifier between said circuits having intermittently acting terminals, an impedance device in each of the circuits leading to said terminals respectively, and adjustable resistance controlling and capacitive controlling means connected between points located between said terminals and their respective impedance devices.

11. The combination of an alternating current supply circuit, a direct current consumption circuit, a rectifier between said circuits having intermittently acting terminals, an impedance device in the circuit leading to one of said terminals, a control transformer having its primary connected across the supply circuit to a point located between said terminal and said impedance device, and a controlling device in the secondary circuit of said control transformer for causing controlling current to pass through the impedance device.

12. The combination of an alternating current supply circuit, a direct current consumption circuit, a rectifier between said circuits having intermittently acting terminals, an impedance device in each of the circuits leading to said terminals respectively, a transformer having its primary connected between points located between said terminals and their respective impedance devices, a controlling device in the secondary circuit of said transformer, and a controlling capacitive device connected in a shunt circuit across the said terminals of the rectifier.

13. The method of controlling the energy delivered in a circuit from an alternating current source which comprises rectifying the alternating current in a series of alternate conducting and non-conducting periods, and determining by adjustment of the flux conditions by passing current from said source in a portion of the circuit during its alternate non-conducting periods of the supply current wave the amount of energy which is to be delivered to the consumption circuit during the alternate conducting periods.

14. The method of controlling the energy delivered in a circuit from an alternating current source which comprises rectifying the alternating current in a series of alternate conducting and non-conducting periods, and determining by adjustment of the electro-magnetic conditions by passing current from said source in a portion of the circuit during its alternate non-conducting periods of the supply current wave the amount of energy which is to be delivered to the consumption circuit during the alternate conducting periods.

15. The method of controlling the energy delivered in a circuit from an alternating current source which comprises rectifying the alternating current in a series of alternate conducting and non-conducting periods, providing impedance in a portion of the circuit which is subjected to alternate conducting and non-conducting periods of the supply current wave, passing a controlling current from said source through said impedance during the alternate non-conducting periods of the supply current wave, and adjusting the said current for controlling the amount of energy which is to be delivered to the consumption circuit during the alternate conducting periods.

16. The combination of an alternating current supply circuit, a consumption device, a rectifier for supplying rectified current to said device, an impedance device in the circuit of the rectifier, said impedance device being subjected to alternate conducting and non-conducting periods of the supply current wave, and adjustable controlling means for passing a controlling current from said supply circuit through said impedance device during the alternate non-conducting periods of the supply current wave.

17. The combination of an alternating current supply circuit, a consumption device, a rectifier for supplying rectified current to said device, an impedance device in the circuit of the rectifier, said impedance device being subjected to alternate conducting and non-conducting periods of the supply current wave, and an adjustable controlling impedance device for passing a controlling current from said supply circuit through said first named impedance device for affecting the flux conditions in the circuit of the rectifier during the alternate non-conducting periods of the supply current wave.

18. The combination of an alternating current supply circuit, a translating device, a half-wave rectifier connected between said circuit and device, an impedance device connected in series in the circuit of said rectifier, and a controlling impedance connected from a point between said impedance device and one of the terminals of the rectifier to another terminal of the rectifier.

19. The combination of an alternating current supply circuit, a consumption circuit, a rectifier comprising an anode between said circuits, adjustable means for causing a controlling current derived from said supply circuit to pass in a portion of the anode circuit before it becomes active and in a direction opposite to that which passes when it becomes active in transmitting energy to the consumption circuit, and means in the anode lead from the supply circuit affected by said controlling current to control the energy transmitted to the consumption circuit.

20. The combination of an alternating current supply circuit, a consumption circuit, a rectifier comprising an anode between said circuits, adjustable means for causing a controlling current derived from said supply circuit to pass in a portion of the anode circuit when the same is otherwise inactive and in a different phase from that of the current when the said anode circuit is transmitting energy to the consumption circuit, and means in the anode lead from the supply circuit affected by said controlling current to control the energy transmitted to the consumption circuit.

21. The combination of an alternating current supply circuit, a consumption circuit, rectifying means comprising anodes between said circuits, adjustable means for causing controlling current derived from said supply circuit to pass successively in a portion of each of the anode circuits at the time they are inactive in transmitting energy to the consumption circuit, and in a direction opposite to that in which the current passes when they become active in transmitting energy to the consumption circuit, and means in the anode leads from the supply circuit affected by said controlling current to control the energy transmitted to the consumption circuit.

FRANK G. LOGAN.